Sept. 29, 1964 D. BUCCICONE 3,150,764
MAGNETIC RAIL CONVEYOR
Filed March 30, 1960 2 Sheets-Sheet 1
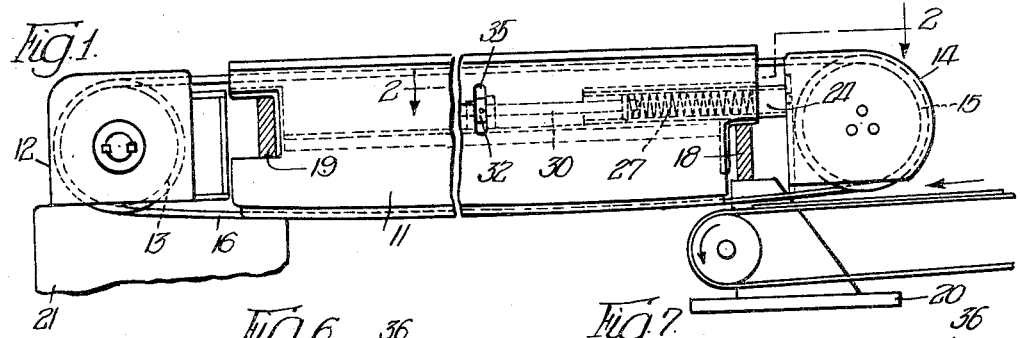
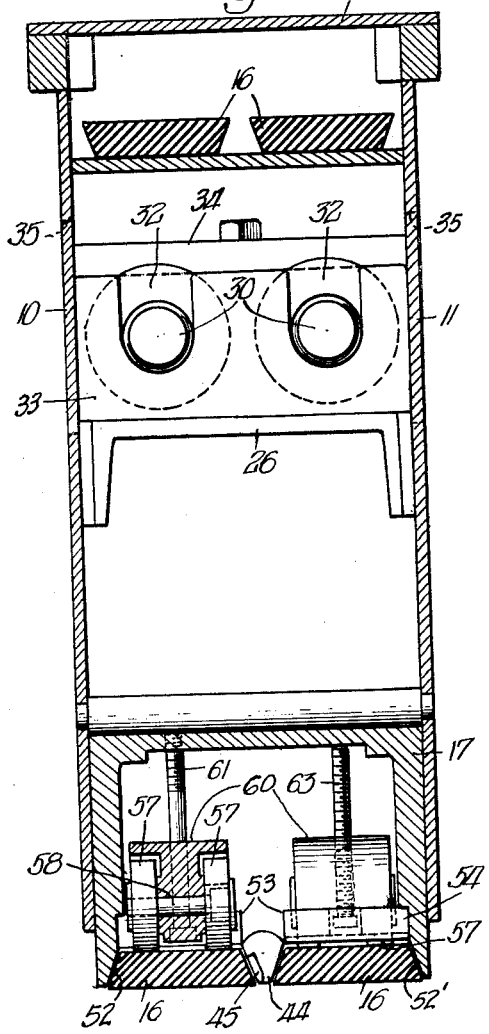
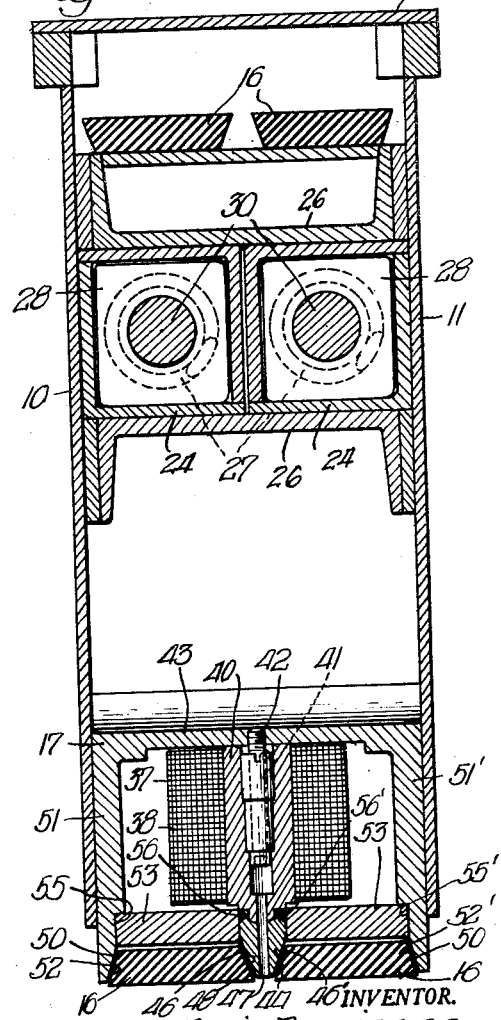
INVENTOR.
Dario Buccicone,
BY
Cromwell, Greist + Warden
Attys.

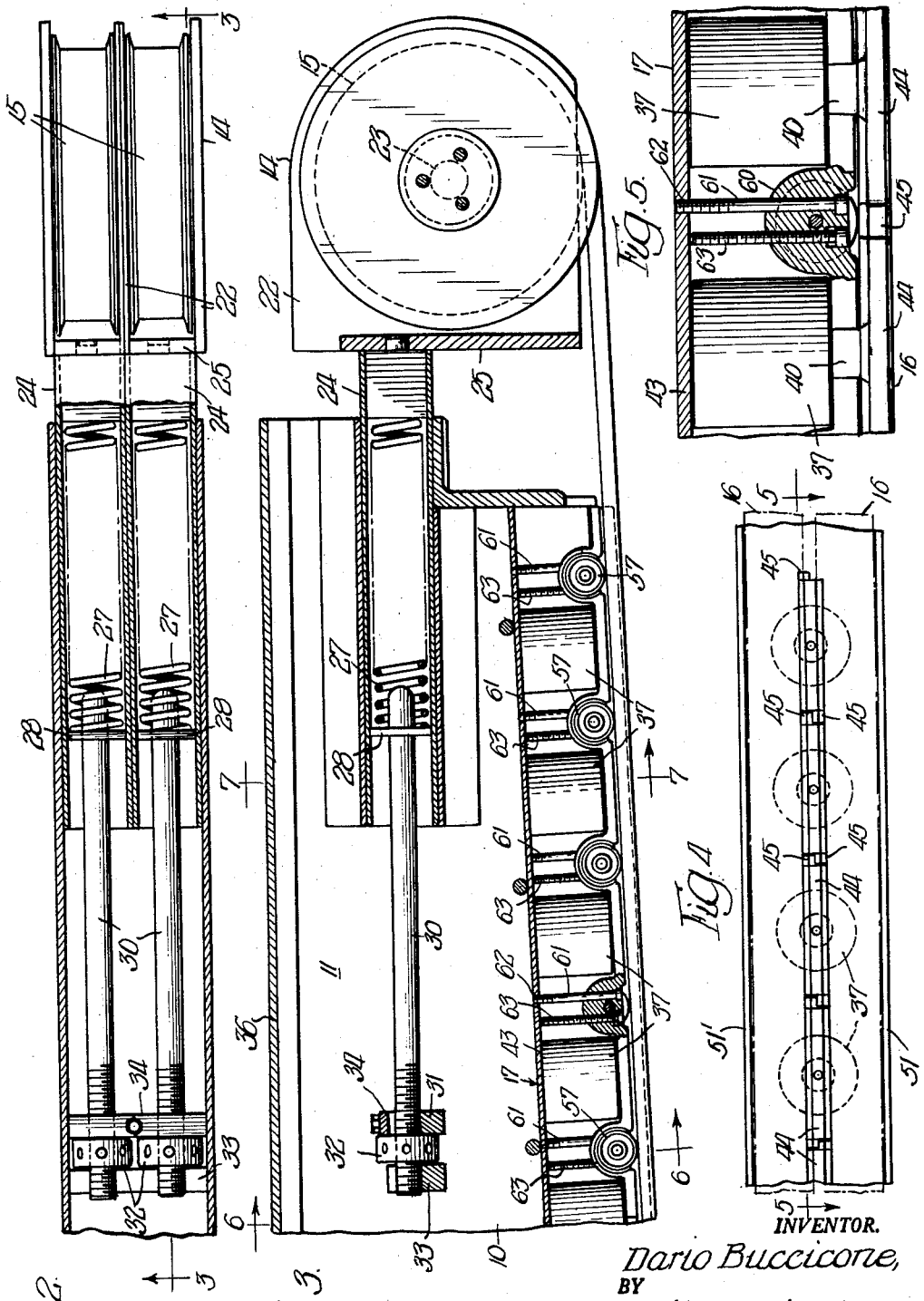

United States Patent Office 3,150,764
Patented Sept. 29, 1964

1

3,150,764
MAGNETIC RAIL CONVEYOR
Dario Buccicone, Gary, Ind., assignor to Buccicone Engineering Co., Inc., Gary, Ill., a corporation of Indiana
Filed Mar. 30, 1960, Ser. No. 18,551
6 Claims. (Cl. 198—41)

This invention relates to article conveyors and is more particularly concerned with improvements in an overhead conveyor of the type which employs electromagnets for holding metal sheets or similar articles against the bottom surface of one or more traveling belts.

This application is a continuation-in-part of application Serial No. 741,785, filed June 13, 1958, now abandoned.

Conveyors of the rail type have heretofore been developed which rely on magnetic force for holding sheet steel or similar materials against the bottom surface of one or more traveling belts as shown for example in my Patents No. 2,374,174, dated April 24, 1945, and No. 2,600,475, dated June 17, 1952. In these prior devices, the belts employed have been relatively narrow, being substantially less in width than the width of the bottom of the conveyor rail. These belts have been arranged in spaced grooves or guide recesses on the bottom surface of a belt guiding plate which is secured in the bottom of the conveyor rail. This type of conveyor arrangement which exposes substantial portions of the belt guiding plate between the belts and at the side edges thereof has been satisfactory for most sheet handling operations where it has had its principal use. However, in handling some types of material such as relatively thin metal sheets the pull of the magnets in a rail which is positioned along the edge of the sheet will cause the edge of the sheet to rub on the exposed surface of the belt guiding plate which creates a drag on the progress of the sheet and may cause undesirable marring or damage to the edge of the sheet. Also, the pull of the magnets may cause the edge of the sheet to dig into the side surfaces of the belt where the sheet is picked up so that the edge falls between the belts, or along the edge of the belts. These disadvantages in handling thin metal sheets with the narrow multiple belt type magnetic conveyors heretofore available have long been recognized and various single wide belt arrangements have been resorted to for handling such sheets. However, narrow multiple belt conveyors have many advantages over single wide belt conveyors and the desirability of providing a narrow multiple belt conveyor which would present a substantially continuous belt surface with which the sheet could engage has long been apparent. It is a general object of the present invention, therefore, to provide a multiple belt magnetic rail type conveyor in which relatively narrow belts are employed and the belts and magnets are arranged so that a substantially continuous flat belt surface is provided for engaging with the sheet or other article to be conveyed without decreasing the effectiveness of the magnets.

It is a more specific object of the invention to provide a magnetic rail type conveyor in which the width of the belts is only slightly less than the transverse dimension of the conveyor, the belts being arranged with their inner adjacent edges very nearly in abutting relation and with portions of the pole pieces of the electromagnets extending between the edges of the belts to a point closely adjacent to the article carrying surfaces of the same.

It is a still more specific object of the invention to provide a magnetic rail type conveyor having downwardly facing magnets spaced along a bottom belt guide, with the lower ends of the pole pieces having tapered side edges

2 in converging relation which terminate at a relatively narrow bottom edge and which form edge guides for a pair of closely spaced article carrying belts, the belts having their side edges tapered to conform to the taper of the side edges of the pole pieces and having a width only slightly less than the width of the conveyor so as to present a relatively broad flat belt surface which is slightly spaced below the lower extremities of the pole pieces.

These and other objects and advantages of the invention will be apparent from a consideration of the conveyor which is shown by way of illustration in the accompanying drawings wherein:

FIGURE 1 is a side elevational view with portions broken away, of a magnetic rail conveyor having incorporated therein the features of the present invention;

FIGURE 2 is a fragmentary horizontal section taken on the line 2—2 of FIGURE 1, to an enlarged scale;

FIGURE 3 is a longitudinal vertical section taken substantially on the line 3—3 of FIGURE 2, to an enlarged scale, and with portions broken away;

FIGURE 4 is a partial bottom plan view;

FIGURE 5 is a fragmentary section taken on the line 5—5 of FIGURE 4, to an enlarged scale;

FIGURE 6 is a vertical cross sectional view taken on the line 6—6 of FIGURE 3, to an enlarged scale; and FIGURE 7 is a cross sectional view taken on the line 7—7 of FIGURE 3, to an enlarged scale.

Referring first to FIGURES 1, 2 and 3, there is illustrated a magnetic rail conveyor unit or assembly which comprises a pair of elongate parallel vertical side plates 10 and 11 arranged in laterally spaced longitudinally extending relation, a housing 12 fixed at one end of the plates which carries a power driven double sheave or pulley 13 and a pair of housings 14 which are adjustably mounted on the other end thereof and which carry idler sheaves 15 so as to permit adjustment of the tension in the sheet carrying belts 16. A channel shaped magnet housing 17 is fastened in downwardly opening relation between the lower margins of the side plates 10 and 11, as by welding or other fastening means, which maintains the side plates in spaced apart relation and forms therewith an elongate frame for the rail unit. The rail unit as illustrated is supported on cross beams 18 and 19, which, in turn, are supported on end stands or frames 20 and 21, While only one conveyor unit or assembly is shown, it will be apparent that several could be supported side by side on the same cross beams 18 and 19, the number depending on the width of the sheets or other articles to be handled.

Each of the pulley housings 14 comprises a pair of laterally spaced side plates 22 (FIGURES 1 to 3) with a short shaft or hub 23 extending between the same on which the belt pulley 15 is rotatably mounted. A mounting member 24, in the form of an elongate hollow tube of rectangular cross section, is secured at one end to a vertical cross plate 25 extending between the inner edges of the side plates 22. The mounting tube member 24 is received in telescoping and sliding relation in a longitudinal guideway formed at the ends of the conveyor side plates 10 and 11 by a pair of vertically spaced, oppositely facing channel members 26 (FIGURE 7), the guideway having a width sufficient to accommodate the mounting tube members 24 for both end pulleys 15. A compression spring 27 is seated in the tube member 24 with the inner end thereof engaging a shoulder forming plate 28 adjacent the end of an adjusting bolt 30 which projects in sliding relation into the open inner end of the tube member 24. The adjusting bolt 30 has its inner end threaded and extends through upwardly opening slots in a cross plate 31 fixed between the conveyor plates 10 and 11. An adjusting nut 32 is mounted on the screw 30 between the slotted cross plate 31 and an adjoining slotted cross plate 33 which is spaced from the plate 31, one of these plates having a top cap 34 to prevent upward movement of the adjusting bolt 30. The conveyor side plates 10 and 11 are slotted at 35 to provide access from the side of the conveyor for operating the nuts 32 so as to adjust the belt tension without removal of the top cover plate 36 or interference with any mechanism which may be mounted on the top of the conveyor unit.

The magnet housing 17 (FIGURE 7) is channel shaped and is arranged with its open face extending downwardly towards the bottom of the conveyor unit. A series of electromagnetic assemblies 37 are arranged in longitudinal alignment and secured within the housing 17. The electromagnetic assemblies 37 each comprise a coil 38 and a core 40. Each of these assemblies is secured in the housing 17 by a stud bolt 41 which extends through the core 40 and engages in a threaded hole 42 provided in the base or web portion 43 of the housing 17. The coils 38 are spaced in the longitudinal direction of the conveyor and each core 40 is provided with an elongate bar forming a longitudinal end extension 44 so that the core and its end extension have the form of an inverted T, with each end extension 44 being aligned with the corresponding core extensions 44 on the adjoining assemblies 37. Each core extension 44 is provided on its opposite ends with small spacer blocks 45 of stainless steel or other non-magnetic material and these spacer blocks 45 are in abutting engagement (FIGURE 4) when the assemblies 37 are installed in the housing 17 so that the coil extensions 44 are held in alignment and a continuous downwardly projecting central rib is provided in the housing while at the same time a large loss in magnetic power is prevented should a coil become defective. Side edge portions 46 and 46' of each core extension 44 are tapered downwardly and inwardly in converging relation and terminate at a relatively narrow bottom face 47. The tapered side edge portions 46 and 46' form inner guides for the inner edges 48 of the belts 16 which edges 48 are tapered to correspond to the taper of the side edge portions 46 and 46' of the core extensions 44. The opposite or outside edges 50 of the belts 16 are also tapered upwardly and inwardly and the bottom inside margins of the side flanges 51 and 51' of the magnet housing 17 are provided with tapered or beveled surfaces at 52 and 52' to form edge guides for the same. Thus the belts 16 are adapted to travel in the space between the confronting side edge guide surfaces 46, 52 and 46', 52'.

The belts 16 are supported on the bottom face of the conveyor unit on a series of belt supporting roller or rider units or assemblies 53 which are arranged in the bottom face of the magnet housing 17 adjacent the uppermost faces of the belts 16. The belt supporting or roller units 53 are aligned longitudinally on each side of the magnet housing 17 with the outside edges of the base portions 54 thereof seated in downwardly and inwardly opening recesses or grooves 55 and 55' provided in the side flanges 51 and 51' of the magnet housing 17 and the inside edges seated against the vertical side edge portions 56 and 56' of the core extension bar members 44. The belt roller units 53 are preferably formed of a length to extend between several of the magnet assemblies 37 and provide longitudinally aligned pairs of belt rollers 57, each pair of which is mounted on a cross shaft 58 journaled in an upstanding roller housing formation 60 which projects above the base portion 54 of the unit, the roller housings 60 being spaced longitudinally so that they are accommodated between the spaced magnet coils 38 and the rollers 57 support the belt 15 between the magnet assemblies 37. The belt roller units or assemblies are suspended from the cross web 43 of the magnet housing 17 by attaching bolts 61 (FIGURES 3 and 6) which extend vertically through the roller housings 60 and have their threaded upper ends engaging in threaded holes 62 provided in the web member 43. An adjusting bolt 63 is provided adjacent each hanger bolt 61 which has a threaded shank engaged in a threaded hole in the roller housing 60 and its end abutting against the inside or lowermost surface of the web member 43 so that the two bolts 61 and 63 may be manipulated to vary the elevation of the rollers 57 and thus adjust the vertical position of the belt 16 which the rollers support, thereby providing for belt adjustment at points adjacent each of the coil assemblies 37.

The belts 16 are of a thickness which results in the bottom surfaces thereof extending slightly below the lowermost extremity of the rib formed by the longitudinally aligned core extensions 44 and the bottom edges of the side flanges 51 and 51' of the magnet housing 17, when the belt roller units 53 are properly adjusted, so that the two belts 16 present a bottom surface which is substantially the width of the conveyor unit and which is substantially continuous across the middle of the unit with the adjacent inner edges of the belts very nearly touching each other.

While particular materials and specific details of construction have been referred to in describing the conveyor structure illustrated, it will be understood that other materials and equivalent structural details may be resorted to within the spirit of the invention.

I claim:

1. In a magnetic rail conveyor unit having a mounting frame with means thereon for supporting on spaced end pulleys a pair of parallel traveling belts, a downwardly opening channel-shaped housing extending along the bottom of the mounting frame, with the side walls having their inside bottom edge portions cut away to form a relatively narrow bottom edge and vertical side edge guides for the outermost edges of said traveling belts along the lower run thereof, belt guiding and supporting members secured in the bottom side of said housing, said guiding and supporting members having their lowermost faces in a transverse plane for engagement by the uppermost flat faces of the belts, and a series of electromagnets supported in longitudinally spaced relation in said housing, each of said electromagnets having a pole piece with a stem forming portion which is positioned vertically within the coil, said pole piece having a bottom bar forming portion which extends longitudinally between said belt guide members and which projects below the bottom face thereof, said pole piece bottom bar portion having its side faces cut away to form a relatively narrow bottom face and vertically extending edge guides for the adjacent inner side edges of said belts, said belts having their side edges shaped to correspond to the shape of the inside edges of the housing side walls and the side faces of the bottom portions of said pole pieces, said belts having their bottom surfaces in a common plane and having their adjacent inner edges separated by only a slight distance so that said belts have a combined width only slightly less than the distance between the exterior bottom edges of said housing side walls and said belts being of substantial thickness with the bottom surfaces of said belts being in planes only slightly below the bottom extremities of the bottom bar portions of said pole pieces.

2. In a magnetic rail conveyor having a mounting frame with means for supporting on spaced pulleys thereon a pair of parallel traveling belts, a downwardly opening channel-shaped housing extending along the bottom of the mounting frame, the side walls of said housing having bottom inside edge portions tapered inwardly and upwardly from a bottom face of narrow width which form side edge guides for the outermost edges of said traveling belts along the lower run thereof, a series of brackets extending along the inside faces of the side walls of said housing and having bottom faces forming belt guides spaced upwardly relative to the narrow bottom faces of the side walls of the housing, means for adjustably supporting said belt guide brackets in said housing, and a series of electromagnets supported in longitudinally spaced relation in said housing, each of said electromagnets having a ring-like coil and a cylindrical core member with the core member positioned vertically within the coil, means to secure each core member to the bottom face of the top wall of said housing, said core member having a bottom extension in the form of an elongate bar which extends longitudinally between said belt guide brackets and below said coil, said core extension projecting below the bottom face of the belt guide brackets and having tapered side edges which converge toward each other in the downward direction and terminate at a bottom face of narrow width, said tapered side edges of said core extension being aligned with adjoining core extensions and forming aligned edge guides for the adjacent inner side edges of said belts, said belts having outer and inner side edges tapered to correspond to the taper of the bottom inside edge portions of the housing side walls and the side edges of said core extension bar, respectively, the inner side edges of said belts at the bottom surfaces thereof being in closely spaced juxtaposed relation and the bottom surfaces of said belts having a combined width only slightly less than the distance between the exterior bottom edges of said housing side walls and the bottom surfaces of said belts when seated on said belt guide brackets being spaced only slightly below the narrow bottom faces of said core extensions and said housing side walls.

3. In a magnetic rail conveyor assembly having a mounting frame with means thereon for supporting on spaced end pulleys a pair of parallel traveling belts, a downwardly opening channel-shaped housing extending along the bottom of the mounting frame, said housing having vertically disposed, laterally spaced side walls with narrow bottom faces and inside bottom edge portions which are cut away to provide longitudinally extending recesses and relatively narrow marginal surfaces which taper inwardly and upwardly from the narrow bottom faces and which form side edge guides for the outermost edges of said traveling belts along the lower run thereof, said housing side walls having the bottom edges tapering toward the ends of the rail assembly so as to correspond to normal sag in the belts, a plurality of relatively short, longitudinally aligned belt guiding and supporting members secured in said housing with the outside edges seated in said recesses in said housing side walls, said belt guiding and supporting members having a plurality of belt supporting rollers mounted to engage the upper faces of the belts, a hanger bolt suspending each of said belt guiding and supporting members from the top wall of said housing and an adjusting bolt associated with each of said hanger bolts for varying individually the elevation of each of said belt guiding and supporting members, and a plurality of electromagnets supported in longitudinally spaced relation in said housing, each of said electromagnets having a coil and an inverted T-shaped core member which is positioned with its stem portion disposed vertically within the coil, said core member having a bar forming bottom portion disposed longitudinally between said belt guiding and supporting members, said core bottom bar forming portion having tapered side faces which converge toward each other in the downward direction and terminate at a bottom face of narrow width which projects below the bottom faces of said belt guiding and supporting members, said tapered side faces being aligned with corresponding faces on the bottom portions of adjoining cores so as to form edge guides for the adjacent inner side edges of said belts, said belts having their outer and inner side edges tapered to correspond to the taper of the bottom edges of the housing side walls and the side edges of said core bottom bar forming portions, respectively, and said belts having their inner side edges terminating closely adjacent each other at the bottom faces of said belts and with the bottom surfaces of said belts in a common plane which is only slightly below the bottom faces of said core bottom bars, whereby said belts present an article receiving surface extending in a substantially continuous unbroken plane across the bottom of said conveyor assembly.

4. In a magnetic conveyor unit having an elongate mounting frame and longitudinally spaced means for supporting a pair of endless traveling belts with the lower runs of said belts moving in side-by-side relation along the bottom face of the mounting frame, a downwardly opening channel-shaped housing extending along the mounting frame and having side wall members with relatively narrow bottom edges, a plurality of depending electromagnets spaced longitudinally in said housing and having pole pieces of inverted T shape with the cross bar forming bottom portions of the pole pieces having their side edges tapered so as to terminate at a relatively narrow downwardly facing edge and being arranged in longitudinally spaced relation, non-magnetic spacer members between adjacent ends of said pole pieces having tapered side edges so as to form a continuous belt guiding center rib formation, a plurality of belt supporting and guiding members mounted in said housing adjacent the opposite side walls thereof and extending in longitudinally aligned relation along opposite sides of the bottom portions of said pole pieces, said belt supporting and guiding members each being of a length sufficient to extend beneath several of the electromagnets and carrying belt engaging rollers spaced longitudinally of said housing between said electromagnets, each of said belt supporting and guiding members having a hanger bolt at each of said rollers which is connected to the top wall of said housing to support said belt supporting and guiding member therefrom, and a position adjusting bolt adjacent each of said hanger bolts which is engaged in threaded relation in an aperture in the belt supporting and guiding member and which is positioned with its upper end bearing against the inside top wall of said housing so as to permit the belt supporting and guiding members to be adjusted vertically to position the lower faces of the belts slightly below the lower edge faces of the housing side walls and the bottom portions of the pole pieces along the length of the conveyor unit.

5. In a magnetic rail conveyor having a mounting frame with means for supporting on spaced pulleys thereon a pair of parallel traveling belts, a downwardly opening, channel-shaped housing extending along the bottom of the mounting frame, the side walls of said housing having bottom inside edge portions tapered inwardly and upwardly from a bottom edge face of narrow width which form side edge guides for the outermost edges of said traveling belts along the lower run thereof, a plurality of brackets extending along the inside faces of the side walls of said housing and having bottom faces forming belt guides spaced upwardly of the bottom edges of the side walls of the housing, said belt guide brackets being of relatively short length, means for adjustably mounting each of said belt guide brackets individually in said housing, and a plurality of electromagnets supported in said housing, each of said electromagnets having a ring-like coil and a cylindrical core member with the core member positioned vertically within the coil, means to secure each core member to the inside face of the top wall of said housing, said core member having a bottom extension in the form of an elongate bar which extends longitudinally between said belt guide brackets, said core extension projecting below the bottom face of the belt guide brackets and having tapered side edges which converge toward each other in the downward direction and terminate at a bottom face of narrow width, said tapered side edges of said core extension being aligned with corresponding side edges of adjacent core extensions and forming edge guides for the adjacent inner side edges of said belts, said core extensions being separated at the ends thereof from adjacent core extensions by relatively short spacer blocks of non-magnetic material so as to break the magnetic connection between the extensions, said belts having outer and inner side edges tapered to correspond to the taper of the bottom inside edge portions of the housing side walls and the side edges of said core extensions, respectively, and the inner edges of said belts at the bottom surfaces thereof being in closely spaced juxtaposed relation and the bottom surfaces of said belts having a combined width only slightly less than the distance between the exterior bottom edges of said housing side walls and the bottom surfaces of said belts when seated on said belt guide brackets being spaced only slightly below the narrow bottom faces of said core extensions and said housing side walls.

6. In a magnetic rail conveyor unit having a mounting frame with means thereon for supporting on spaced end pulleys a pair of parallel traveling belts, a downwardly opening channel-shaped housing extending along the bottom of the mounting frame, with the side walls having their inside bottom edge portions cut away to form a relatively narrow bottom edge and vertical side edge guides for the outermost edges of said traveling belts along the lower run thereof, belt guiding and supporting members of relatively short length individually secured in longitudinally aligned relation in the bottom side of said housing, said belt guiding and supporting members having their lowermost faces in a transverse plane for engagement by the uppermost flat faces of the belts, and a plurality of electromagnets supported in longitudinally spaced relation in said housing, each of said electromagnets having a coil and a pole piece with a stem forming portion which is secured within the coil, a stud bolt seated in a bore in the core with its head trapped in an inner section of the bore which is of enlarged diameter, said pole piece having a bottom bar forming portion which extends longitudinally between said belt guide members and which projects below the bottom face thereof, said pole piece bottom bar portion having its side faces cut away to form a relatively narrow bottom face and vertically extending edge guides for the adjacent inner side edges of said belts, a bore of relatively small diameter in said bar portion which is aligned with the stud receiving bore in the stem portion to accommodate a tool for turning the stud, said belts having their side edges shaped to correspond to the shape of the inside edges of the housing side walls and the side faces of the bottom portions of said pole pieces, said belts having their bottom surfaces in a common plane and having their adjacent inner edges separated by only a slight distance so that said belts have a combined width only slightly less than the distance between the exterior bottom edges of said housing side walls and said belts being of substantial thickness with the bottom surfaces of said belts being in planes only slightly below the bottom extremities of the bottom bar portions of said pole pieces.

References Cited in the file of this patent

UNITED STATES PATENTS

| | | |
|---|---|---|
| 2,600,475 | Buccicone | June 17, 1952 |
| 2,642,174 | Buccicone | June 16, 1953 |